UNITED STATES PATENT OFFICE.

JOHN E. GIBSON, OF CLARKE COUNTY, ASSIGNOR OF ONE-HALF OF HIS RIGHT TO JOSEPH C. CALVERT, OF UPPERVILLE, VIRGINIA.

INSECTICIDE COMPOUND.

SPECIFICATION forming part of Letters Patent No. 225,697, dated March 23, 1880.

Application filed September 4, 1879.

*To all whom it may concern:*

Be it known that I, JOHN E. GIBSON, of Clarke county and State of Virginia, have invented or discovered a useful Compound for the Destruction of Injurious Insects; and I do hereby declare that the following is a full, clear, and exact description of the same.

This invention or discovery is a compound for the destruction of noxious insects, particularly the *Ægeria exitiosa*, or borer, which infests the roots of fruit-trees.

The ingredients employed are as follows: tar, say one gallon; paris-green, say one-half ounce; sulphur, say two ounces; saltpeter, say one ounce. Gas-tar is preferred. In place of paris-green some other form of arsenic may be preferred.

These ingredients are properly mixed and applied to the bark and roots of trees, to serve as a protection from *Ægeria exitiosa*, or borer, and also to destroy the same.

Having thus described my invention, what I claim as new, and desire to secure by Letters Patent, is—

The compound described, consisting of tar, paris-green, sulphur, and saltpeter.

This specification signed and witnessed this 25th day of August, A. D. 1879.

JOHN E. GIBSON.

Witnesses:
    J. J. RIELY,
    A. D. HARDESTY.